(12) United States Patent
Rigollé et al.

(10) Patent No.: US 9,059,788 B2
(45) Date of Patent: Jun. 16, 2015

(54) METHOD AND DEVICE FOR DETERMINING PATHS IN MULTIPATH SEARCH

(75) Inventors: Arnaud Rigollé, Erce Pres Liffre (FR); Pierre Didier, Rennes (FR)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/368,903

(22) PCT Filed: Dec. 27, 2011

(86) PCT No.: PCT/IB2011/003318
§ 371 (c)(1),
(2), (4) Date: Jul. 25, 2014

(87) PCT Pub. No.: WO2013/098581
PCT Pub. Date: Jul. 4, 2013

(65) Prior Publication Data
US 2014/0348215 A1    Nov. 27, 2014

(51) Int. Cl.
*H04B 1/00*    (2006.01)
*H04B 1/7113*    (2011.01)
*H04B 1/7117*    (2011.01)

(52) U.S. Cl.
CPC ............ *H04B 1/7113* (2013.01); *H04B 1/7117* (2013.01); *H04B 2201/709745* (2013.01)

(58) Field of Classification Search
CPC .... H04B 1/7115; H04B 1/7117; H04B 1/712; H04B 1/30; H04B 1/1027; H04L 27/2647; H04L 25/03057

USPC ................... 375/148, 316, 346, 348
See application file for complete search history.

(56) References Cited

U.S. PATENT DOCUMENTS

| 6,731,622 | B1 | 5/2004 | Frank et al. | |
| 2003/0081659 | A1* | 5/2003 | Yousef et al. | 375/148 |
| 2004/0048593 | A1* | 3/2004 | Sano | 455/323 |

FOREIGN PATENT DOCUMENTS

EP    1482650    12/2004

OTHER PUBLICATIONS

3GPP TS 25.211 V11.4.0 (Jun. 2013) Technical Specification Group Radio Access Network; Physical Channels and Mapping of Transport Channels onto Physical Channels (FDD) Release 11; (63 pages).

* cited by examiner

*Primary Examiner* — Ted Wang
(74) *Attorney, Agent, or Firm* — Oblon, McClelland, Maier & Neustadt, L.L.P.

(57) ABSTRACT

For determining paths in the scope of a multipath search, a device for use in a wireless communications system performs: obtaining a delay profile of a code division multiple access transmission signal, the delay profile being in a form of complex symbols, each complex symbols resulting from a despreading of said received signal after being delayed by a distinct delay; comparing the real part of said complex symbols forming the delay profile with a first threshold, the first threshold being determined on the basis of a noise level determined by the imaginary part of said complex symbols forming the delay profile; and determining said paths on the basis of the comparing.

20 Claims, 4 Drawing Sheets

METHOD AND DEVICE FOR DETERMINING PATHS IN MULTIPATH SEARCH

Figure 2:
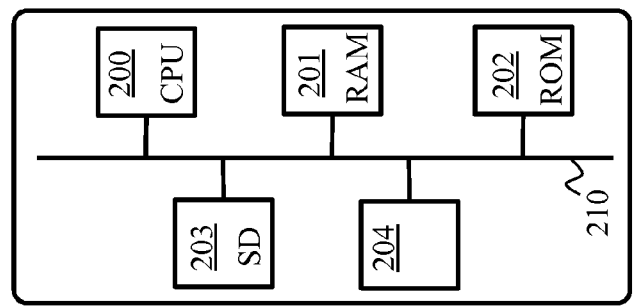

The present invention generally relates to multipath search for configuring a receiver on the basis of a delay profile, when receiving signals in a wireless telecommunications system.

In wireless telecommunications systems, a signal received by a receiver device is generally composed of several delayed echoes of a signal transmitted by a transmitter device due to reflections on physical obstacles. This phenomenon is referred to as multipath transmission. An estimation of the multipath delays shall then be performed by the receiver device in order to correctly demodulate the received signal.

Such multipath estimation is more particularly used in the context of rake receiver devices or of LMMSE (Linear Minimum Mean Square Error) receiver devices.

A rake receiver device is a radio receiver device designed to counter the effects of multipath fading. A rake receiver uses several fingers, i.e. several correlators, each assigned for decoding a different multipath component. Then the contributions of all fingers are combined in order to take benefit of the diversity of the transmission paths.

Correlation between a pilot pattern known code sequence and the received signal allows defining a delay profile, in which peaks of energy correspond to the delays of the multipath transmission. The delay profile gives the intensity of a signal received via a multipath channel as a function of time delay. The time delay is the difference in travel time between multipath arrivals. The delay profile is generally represented by a graph, in which the abscissa is in units of time and the ordinate usually represents power in decibels. The delay profile allows extracting channel's characteristics such as a delay spread, which provides an indication of the multipath richness of the channel.

To determine the delay profile, the receiver device provides the received signal in plural copies and then each copy of the signal is delayed by the receiver device by a distinct delay. A despreading operation consisting in a complex correlation is then applied to each delayed copy in case of CDMA (Code Division Multiple Access) transmissions.

The power of the despread signal is then typically computed as the sum of its squared real part and of its squared imaginary part. Power of the despread signal is finally integrated over time to mitigate the variations due to fast fading channel.

Integrating the power of the despread signal, referred to as non-coherent integration, does not improve the SNR (Signal-to-Noise Ratio) since integrated power contains both useful signal power but also noise power. Therefore, for a given delay, the resulting energy in the delay profile may be significantly increased due to the presence of noise, and such a situation may lead to an erroneous result of the multipath search. Therefore, the performance of the receiver device would be reduced.

Therefore the paths may not be accurately determined.

It is desirable to overcome the aforementioned drawbacks of the state of the art.

It is more particularly desirable to provide a solution that allows accurately determining the paths from a received signal in a wireless communications system.

It is furthermore desirable to provide a solution that is cost-effective in terms of resources used for delay profile computation and analysis, without significant impact on the BER (Bit Error Rate) performance at the receiver level.

It is desirable to reach at least one of the aforementioned objectives in the scope of CDMA (Code Division Multiple Access) communications systems, and more particularly in WCDMA (Wideband CDMA) communications systems.

To that end, the present invention concerns a method for determining paths in the scope of a multipath search aiming at being used to configure a device of a wireless communications system, the method causing the device to perform: obtaining a delay profile of a code division multiple access transmission signal, the delay profile being in a form of complex symbols, each complex symbols resulting from a despreading of said received signal after being delayed by a distinct delay; comparing the real part of said complex symbols forming the delay profile with a first threshold, the first threshold being determined on the basis of a noise level determined by the imaginary part of said complex symbols forming the delay profile; and determining said paths on the basis of the comparing.

Thus, using a delay profile based on complex signals allows to improve the SNR of the delay profile by coherent integration. Integration is said to be coherent since it is performed using the received signal itself, composed of useful signal plus noise signal that can be separated by integration, and not using the power of the received signal, the power operator used typically for non-coherent integration inducing an inextricable mixture of useful signal and noise. In addition, determining the noise level thanks to the imaginary part of said complex signals allows a better accuracy in the noise determination. Finally, a better accuracy in the paths determination can therefore be reached.

The present invention also concerns a device for determining paths in the scope of multipath search, said device being adapted for use in a wireless communications system, wherein said device for determining paths comprises circuitry causing the device to implement: means for obtaining a delay profile of a code division multiple access transmission signal, the delay profile being in a form of complex symbols, each complex symbol resulting from a despreading of said received signal after being delayed by a distinct delay; means for comparing the real part of said complex symbols forming the delay profile with a first threshold, the first threshold being determined on the basis of a noise level determined by the imaginary part of said complex symbols forming the delay profile; and means for determining said paths on the basis of the comparing.

The present invention also concerns a device for determining paths in the scope of multipath search, said device being configured for use in a wireless communications system, wherein said device for determining paths comprises circuitry causing the device to perform: obtaining a delay profile of a code division multiple access transmission signal, the delay profile being in a form of complex symbols, each complex symbol resulting from a despreading of said received signal after being delayed by a distinct delay; comparing the real part of said complex symbols forming the delay profile with a first threshold, the first threshold being determined on the basis of a noise level determined by the imaginary part of said complex symbols forming the delay profile; and determining said paths on the basis of the comparing.

The present invention also concerns a computer program that can be downloaded from a communication network and/or stored on a medium that can be read by a computer or processing device. This computer program comprises instructions for causing implementation of the aforementioned method, when said program is run by a processor.

The present invention also concerns an information storage means, storing a computer program comprising a set of instructions causing implementation of the aforementioned method, when the stored information is read from said information storage means and run by a processor.

Since the features and advantages related to the device and to the computer program are identical to those already mentioned with regard to the corresponding aforementioned method, they are not repeated here.

Figure 1:
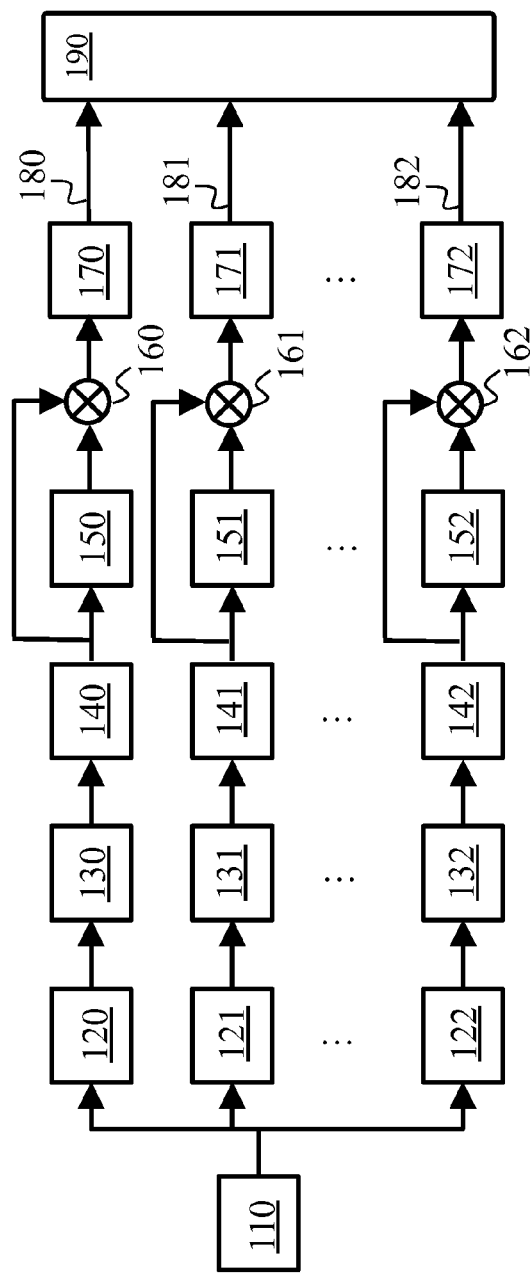
Figure 3:
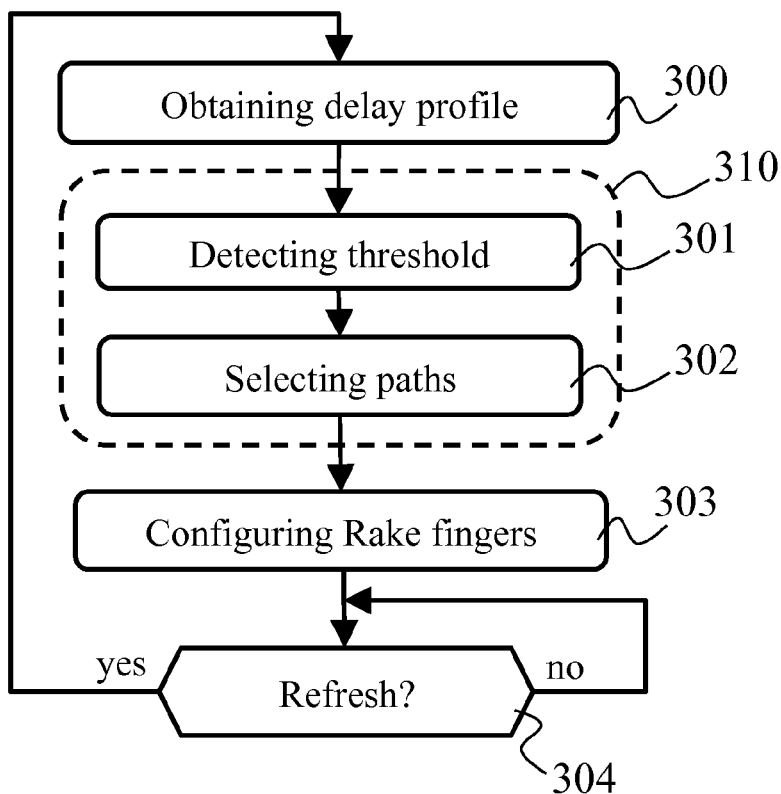
Figure 4:
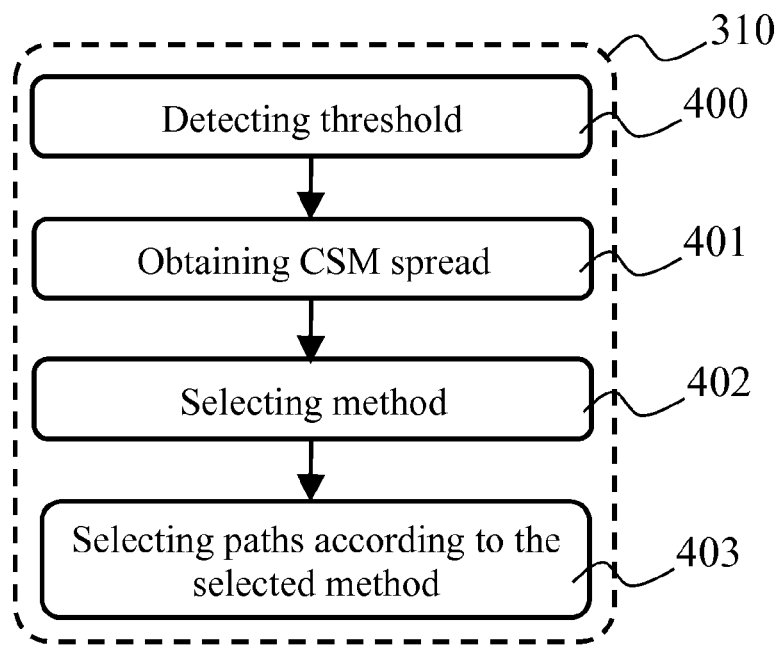
Figure 5:
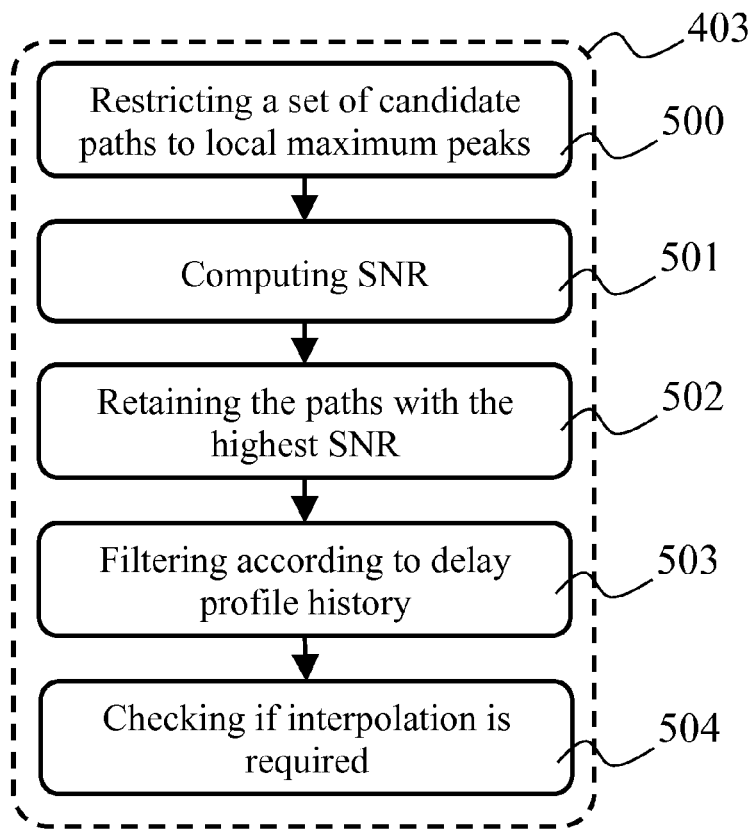
Figure 6:
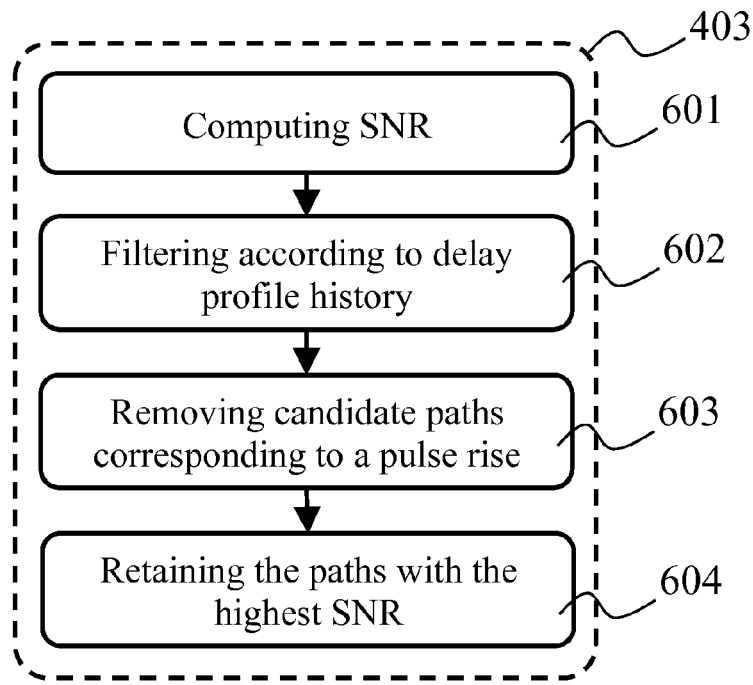
Figure 7:
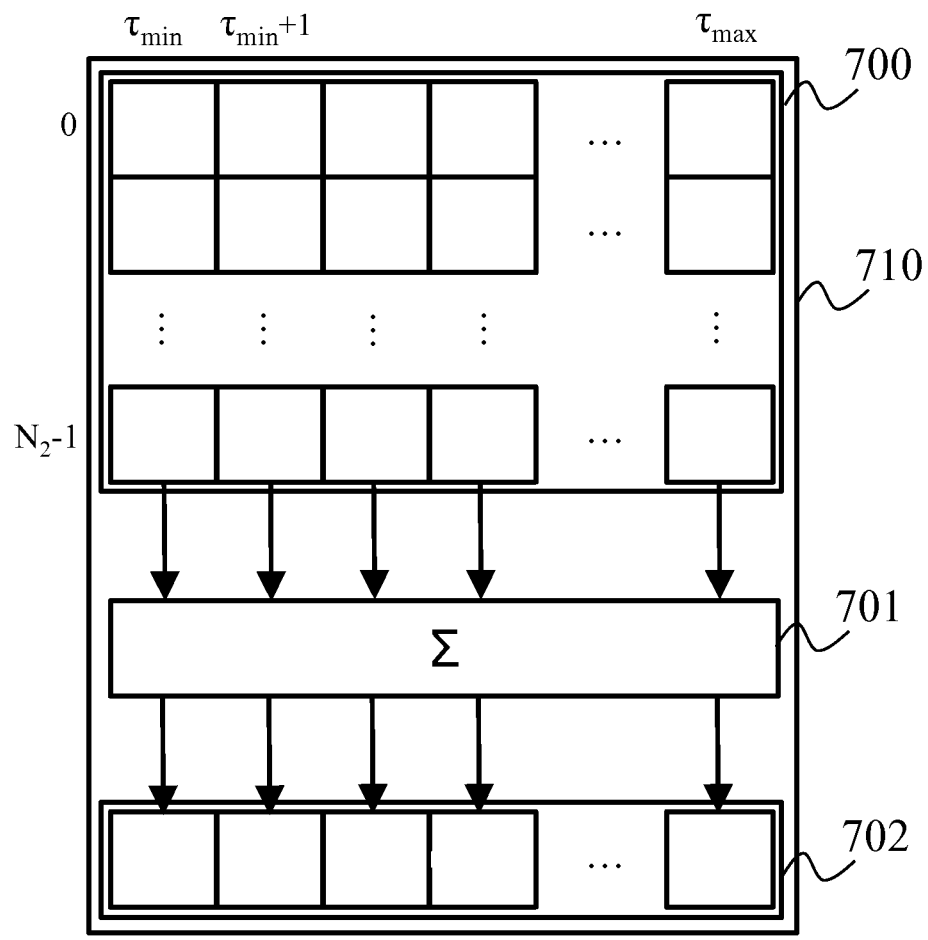

The characteristics of the invention will emerge more clearly from a reading of the following description of an example of embodiment, said description being produced with reference to the accompanying drawings, among which:

FIG. 1 schematically represents a portion of a receiver device comprising a delay profile determination unit and a delay profile analysis unit;

FIG. 2 schematically represents an architecture of a receiver device in which the present invention may be implemented;

FIG. 3 schematically represents an algorithm performed by the receiver device for configuring the receiver device on the basis of a delay profile;

FIG. 4 schematically represents an algorithm performed by the receiver device for multipath search;

FIG. 5 schematically represents an algorithm performed by the receiver device for refining the results of multipath search, according to a first embodiment;

FIG. 6 schematically represents an algorithm performed by the receiver device for refining the results of multipath search, according to a second embodiment;

FIG. 7 schematically represents a rectangular Finite Impulse Response filter that may be used in the first and/or second embodiments for refining the results of the multipath search.

The present invention aims at being implemented in a CDMA communications system at least comprising a transmitter and a receiver.

Whereas the invention is more particularly described hereafter in the context of a WCDMA communication system, the same principles apply more generally in CDMA communications system.

Preferably, the receiver device is a mobile station (MS), also referred to as user equipment (UE), and the transmitter device is a base station, a base transceiver station (BTS) or a Node B of a Universal Mobile Telecommunications System (UMTS). Alternatively, the receiver device may also be a modem device, which may be installed as part of a MS or UE, but may be also a separate module, which can be attached to various devices for providing those devices with capability to communicate wirelessly.

FIG. 1 schematically represents a portion of a receiver device comprising a delay profile determination unit and a delay profile analysis unit 190. The delay profile determination unit comprises:

a signal receiver 110;
a set of delay lines 120, 121, 122;
a set of despreading units 130, 131, 132;
a set of first coherent integration units 140, 141, 142;
a set of delaying buffers 150, 151, 152;
a set of combiners 160, 161, 162; and
a set of second coherent integration units 170, 171, 172.

For illustrative purpose, only three elements are shown in the set of delay lines, in the set of despreading units, in the set of first coherent integration units, in the set of delaying buffers, in the set of combiners and in the set of second coherent integration units. The delay profile determination unit may comprise a different number of elements in these sets, keeping in mind that the sets however comprise a same number of elements.

The signal receiver 110 receives a WCDMA signal and provides this WCDMA signal to each delay lines 120, 121, 122. Plural copies of the WCDMA signal are therefore provided and such copies of the WCDMA signal are input to respective delay lines 120, 121, 122. The delay lines 120, 121, 122 apply a distinct delay $\tau$ to the WCDMA signal. The delays $\tau$ applied by the respective delay lines are comprised between a minimum delay value $\tau_{min}$ and a maximum delay value $\tau_{max}$.

Each delay line 120, 121, 122 is connected to a despreading unit 130, 131, 132 and provides to the concerned despreading unit a delayed WCDMA signal.

Each despreading unit 130, 131, 132 is connected to a first coherent integration unit 140, 141, 142 and provides to the concerned first coherent integration unit despread symbols $D_n(\tau)$, which are defined as follows:

$$D_n(\tau) = \sum_{k=0}^{c-1} (R_{c \cdot n+k+\tau} \times PN^*_{c \cdot n+k} \times A^*_k)$$

wherein:
R represents the received WCDMA signal;
A represents the pilot pattern as used by the transmitter, which is known by the receiver device and more particularly by the delay profile determination unit;
PN represents a pseudo-noise scrambling sequence;
k represents a chip counter as used during the despreading operation;
c represents the equivalent duration in chips of a $D_n$ symbol, commonly referred to as spreading factor;
n represents a despread symbol counter, each symbol having a unitary length equal to the symbol duration and referred to as Ts;
and wherein X* represents the complex conjugate of X.

A chip is a pulse of a Direct-Sequence Spread Spectrum (DSSS) code, such as a pseudo-noise code sequence used in direct-sequence CDMA channel access techniques.

In a particular embodiment, the number c of chips equals 512, which allows compatibility with open-loop space time transmit diversity CPICH (Common Pilot Indicator CHannel) pilot pattern as defined by the specification 3GPP TS 25.211 "*Physical channels and mapping of transport channels onto physical channels (FDD)*". In WCDMA FDD (Frequency Division Duplex) cellular systems, CPICH is a downlink channel broadcast by Node Bs with slowly varying power and of a known bit sequence.

Each first coherent integration unit 140, 141, 142 is connected to an inter-correlation computation unit composed by a delaying buffer 150, 151, 152 and a combiner 160, 161, 162. Each first coherent integration unit 140, 141, 142 provides to the concerned inter-correlation computation unit integrated despread symbols $D'_m(\tau)$, or simply called integrated symbols, which are defined as follows:

$$D'_m(\tau) = \frac{1}{M} \sum_{n=0}^{M-1} D_{M \cdot m+n}(\tau)$$

wherein:
m represents a counter of integrated despread symbols, each one having a unitary length equal to M times the symbol duration (M.Ts);

M represents a number of despread symbols on which the first coherent integration operation is applied, and M≥2; and n represents a symbol counter as used during the first coherent integration operation.

In a particular embodiment, the number M of integrated despread symbols equals 2, which allows accuracy in determining the delay profile even in fast varying channel conditions. In addition, the processing time period for determining the delay profile is shortened.

Each inter-correlation computation unit is connected to a second coherent integration unit 170, 171, 172 and provides to the concerned second coherent integration unit complex symbols $IQ_p(\tau)$, which are defined according to two possible variants.

A first variant is expressed as follows:

$$IQ_p^{(1)}(\tau) = D'^*_{m-1}(\tau) \times D'_m(\tau)$$

wherein p represents a counter of integrated symbols, each one having a unitary length equal to 2.M times the symbol duration (2.M.Ts);

In a second variant, the complex symbols $IQ_p(\tau)$ are defined as follows:

$$IQ_p^{(2)}(\tau) = IQ_p^{(1)*}(\tau) = D'_{m-1}(\tau) \times D'^*_m(\tau)$$

Each delaying buffer 150, 151, 152 is therefore used to store the symbol $D'_m(\tau)$ during one operation cycle, so as to allow the multiplication with the next symbol in sequence by the combiner 160, 161, 162, one of them being conjugated.

Each second coherent integration unit 170, 171, 172 provides complex symbols $IQ'_l(\tau)$, which are defined as follows:

$$IQ'_l(\tau) = \frac{1}{N_{coh}} \sum_{p=0}^{N_{coh}-1} IQ_{N_{coh} \cdot l + p}(\tau)$$

wherein:

the complex symbols $IQ_p(\tau)$ correspond equivalently either to $IQ_p^{(1)}(\tau)$ or $IQ_p^{(2)}(\tau)$;

$N_{coh}$ represents a number of complex symbols on which the second coherent integration operation is applied;

p represents a counter as used during the second coherent integration; and l represents a counter of integrated symbols, each one having a unitary length equal to $N_{coh}$ multiplied by 2.M times the symbol duration (2.M.$N_{coh}$.Ts).

The number $N_{coh}$ of complex symbols on which the second coherent integration operation is applied is preferably defined to allow an accumulation over approximately one frame of the WCDMA transmission between the transmitter device and the receiver device. In terms of accumulation duration, the number $N_{coh}$ of complex symbols on which the second coherent integration operation is applied preferably corresponds approximately to a 10 ms time period of WCDMA transmission between the transmitter device and the receiver device.

The set of signals 180, 181, 182 provided by the second coherent integration unit 170, 171, 172 forms the delay profile. In other words, each signal 180, 181, 182 represents a part of the delay profile, said part of the delay profile corresponding to the delay applied by the delay line 120, 121, 122.

The symbols $IQ_p(\tau)$ being computed as the complex multiplication of two successive integrated despread symbols $D'_{m-1}(\tau)$ and $D'_m(\tau)$, one of them being conjugated, it can be noticed that:

their magnitude (or complex modulus) is homogeneous to the power of integrated despread symbols; and their noise level is reduced and has a zero expectancy value as the result of the product of two uncorrelated noise sequences.

It results in an increase of the SNR during the coherent integration performed by the second coherent integration unit 170, 171, 172. It should be noted that such an increase of the SNR wouldn't have been achievable if the accumulation would have been performed on the basis of a power signal defined by $|D'_m(\tau)|^2$, since the second integration would be no more coherent in this case, as the signal power and also the noise power would then be integrated.

The delay profile is provided to the delay profile analysis unit 190 in the form of the set of signals 180, 181, 182. In other words, the delay profile analysis unit 190 receives the complex symbols $IQ'_l(\tau)$ provided by each second coherent integration unit 170, 171, 172.

FIG. 2 schematically represents an architecture of a receiver device in which the present invention may be implemented.

According to the shown architecture, the receiver device comprises the following components interconnected by a communications bus 210: a processor, microprocessor, microcontroller or CPU (Central Processing Unit) 200; a RAM (Random-Access Memory) 201; a ROM (Read-Only Memory) 202; an SD (Secure Digital) card reader 203, or any other device adapted to read information stored on storage means; and a communication interface 204.

The communication interface 204 allows the receiver device to wirelessly communicate with the transmitter device.

CPU 200 is capable of executing instructions loaded into RAM 201 from ROM 202 or from an external memory, such as an SD card. After the receiver device has been powered on, CPU 200 is capable of reading instructions from RAM 201 and executing these instructions. The instructions form one computer program that causes CPU 200 to perform some or all of the steps of the algorithms described hereafter with regard to FIGS. 3 to 6.

Any and all steps of the algorithms described hereafter with regard to FIGS. 3 to 6 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the receiver device includes circuitry, or a device including circuitry, causing the receiver device to perform the steps of the algorithms described hereafter with regard to FIGS. 3 to 6. Such a device including circuitry causing the receiver device to perform the steps of the algorithms described hereafter with regard to FIGS. 4 and 5 may be an external device connectable to the receiver device. Such device may also be installed as part of a receiver device, in example, in form of a chip, a chipset, or a module. Alternatively, instead of being installed or connected to a dedicated communication or receiver device, the device according to the invention may provide communication capability to any suitable device, such as a computer device, a machine, in example, a vending machine, or a vehicle like a car or truck, where the device may be installed in or connected to for this purpose. The term circuitry refers either to hardware implementation, consisting in analogue and/or digital processing, or to a combination of hardware and software implementation, including instructions of computer program associated with memories and processor causing the processor to perform any and all steps of the algorithms described hereafter with regard to FIGS. 3 to 6.

FIG. 3 schematically represents an algorithm performed by the receiver device for configuring the receiver device on the basis of a delay profile. The receiver device may be a rake receiver device or an LMMSE receiver device.

The delay profile consists of a set of complex symbols $IQ'_i(\tau)$, in the form as already described with regard to FIG. 1. The set of complex symbols is for instance provided by the second coherent integration units 170, 171, 172. The set of complex symbols may be differently provided, for instance by an external device receiving the WCDMA signals from the transmitter device.

In the context of the present illustrative embodiment, the algorithm of FIG. 3 is more particularly performed by the delay profile analysis unit 190.

In a step 300, the delay profile analysis unit 190 obtains the delay profile consisting of the set of complex symbols $IQ'_i(\tau)$.

In a following step 310, the delay profile analysis unit 190 performs the analysis of the delay profile obtained during the step 300.

The step 310 at least comprises a step 301 of detecting whether the delay profile, for a at least one delay value $\tau$, is greater than a predetermined threshold T. Such threshold T is for instance predefined, and therefore fixed, on the basis of a noise level determined from the imaginary part Q of the complex symbols $IQ'_i(\tau)$. An illustrative embodiment is described hereafter with regard to FIG. 4, and is applicable here. The step 310 at least further comprises a following step 302 of selecting paths, i.e. values of the delay $\tau$, which shows a level of energy greater than the predetermined threshold T, as results of the multipath search. Two illustrative algorithms of multipath search refining methods are detailed hereafter with regard to FIGS. 5 and 6. The delay profile analysis unit 190 may apply one or the other.

In a following step 303, the delay profile analysis unit 190 causes the receiver device to configure itself, such as to configure the rake fingers for a rake receiver device, on the basis of the paths resulting from the multipath search. Typically, this configuration is performed by a baseband inner receiver unit of the receiver device.

In a following step 304, the delay profile analysis unit 190 checks whether there is a need for refreshing the receiver device configuration. When such a refresh is needed, the step 300 is repeated; otherwise, the step 304 is repeated. For instance, the delay profile analysis unit 190 checks whether a predefined update time period has elapsed. Therefore, a new delay profile is determined after a predefined time period elapses since the preceding obtaining of a preceding delay profile. In a particular embodiment, the steps 300 and 310 are reiterated every 10 frames of the WCDMA transmission from the transmitter device to the receiver device. In terms of time duration, the steps 300 and 310 are reiterated every 100 ms in this particular embodiment. It means that the time period to refresh the delay profile is substantially ten times the time period of accumulation used for determining the delay profile. Thus, the resources necessary for determining and analysing the delay profile are limited, without significant impact on the BER (Bit Error Rate) performance of the transmission even in fast-fading conditions.

It can also be noted that during reiteration the step 303 may be skipped if the delay profile analysis doesn't show any change in the results of the multipath search.

FIG. 4 schematically represents an algorithm performed by the receiver device for multipath search.

In the context of the present illustrative embodiment, the algorithm of FIG. 4 is more particularly performed by the delay profile analysis unit 190.

The algorithm of FIG. 4 shows an illustrative embodiment of the step 310, already described with regard to FIG. 3.

In a step 400, the delay profile analysis unit 190 detects whether the delay profile, for a at least one delay value $\tau$, is greater than a predetermined threshold T.

The threshold T is determined on the basis of the imaginary Q and real I parts of the complex symbols $IQ'_i(\tau)$.

The imaginary part Q of the complex symbols $IQ'_i(\tau)$ is used to determine the noise level $P_{noise}$, which is defined as follows:

$$P_{noise} = \frac{1}{\Delta t} \sum_{\tau=\tau_{min}}^{\tau_{max}} |DP(\tau) \cdot Q|$$

wherein:
$\Delta T = \tau_{max} - \tau_{min}$ corresponds to the correlation comb depth of the delay profile;
$DP(\tau)$ represents the delay profile complex value for the delay $\tau$;
and wherein .Q represents the imaginary part operator.
The threshold T is determined as follows:

$$T = \max\left[\frac{DP_{max}}{k1}, P_{noise} * k2\right]$$

wherein:
$k_1$ represents a first constant value, with $k_1 \geq 1$;
$k_2$ represents a second constant value, with $k_2 \geq 1$;
$DP_{max}$ represents the maximum value of the real part I of the complex symbols $IQ'_i(\tau)$, and is defined as follows:

$DP_{max} = \max_\tau[0, DP(\tau).I]$ wherein .I represents the real part operator.

The constant values $k_1$ and $k_2$ are defined as a trade-off between maximization of paths detection probability and minimization of false alarm probability. The constant values $k_1$ and $k_2$ are for instance determined empirically or using simulation tools based on a model of the transmission channel from the transmitter device to the receiver device. In a particular embodiment, $k_1$ and $k_2$ are respectively equal to 16 and 3.

The threshold T is then defined as follows in good SNR conditions:

$$T = \frac{DP_{max}}{k1}$$

and as follows in poor SNR conditions:

$T = P_{noise} * k_2$

In other words, in good SNR conditions, the threshold T is defined as the positive maximum value of the real part I of the complex symbols $IQ'_i(\tau)$ divided by a first constant greater or equal to 1, and in bad SNR conditions, the threshold T is defined as a level of noise determined via the imaginary part Q of the complex symbols $IQ'_i(\tau)$ multiplied by a second constant greater or equal to 1.

It can be noted that the threshold T may be predefined equal to one of these values, when the SNR conditions are a priori known.

In a following step 401, the delay profile analysis unit 190 determines a CSM spread value, wherein CSM stands for Closely Spaced Multipath. The CSM spread value corresponds to an indication of successive values of the delay τ for which the level of energy is greater than or equal to the threshold T. If the delay profile presents plural bunches of successive values of the delay τ for which the level of energy is greater than or equal to the threshold T, then the delay profile analysis unit 190 selects the bunch with the maximum number of successive values of the delay τ for which the level of energy is greater than or equal to the threshold T. The CSM spread value corresponds to the selected number of successive values of the delay τ for which the level of energy is greater, or equal to, the threshold T.

The delay profile may be classified in one among two categories: a SMIM category and a CSM category, wherein SMIM stands for Separated Multipath with Interpolation Management.

The SMIM category corresponds to a delay profile in which all candidate paths can be easily distinguished from each other in the sense that at least one delay profile symbol lies below the detection threshold T between two candidate paths.

The CSM category gathers all other delay profile scenarios: in this case, the propagation channel contains multipath replicas whose delay values are very close to each other and that the delay profile finite resolution does not allow to distinguish from each other. In other words, it exists at least one couple of candidate paths for which there is no delay profile symbol lying below the detection threshold T between said candidate paths.

Considering that the transmission channel conditions evolve, the delay profile may switch from one category to the other between one instant and a later one.

In a following step 402, the delay profile analysis unit 190 selects a multipath search refining method on the basis of the CSM spread value determined in the step 401. The CSM spread value is compared with a predefined threshold MST (Method Selection Threshold). When the CSM spread value is lower than the threshold MST, it is considered that the delay profile is in the SMIM category and a SMIM method is applied. An illustrative algorithm corresponding to the SMIM method is detailed hereafter with regard to FIG. 5.

When the CSM spread value is greater than or equal to the threshold MST, it is considered that the delay profile is in the CSM category and a CSM method is applied. An illustrative algorithm corresponding to the CSM method is detailed hereafter with regard to FIG. 6.

In a following step 403, the delay profile analysis unit 190 applies the multipath search refining method selected in the step 402.

In a particular embodiment, in order to limit switches between the SMIM and CSM methods, the CSM spread value used for selecting the multipath search refining method is obtained by averaging the CSM spread value over plural instances of the delay profile. A set of CSM spread values is therefore determined for a predefined number $N_1$ of delay profiles, i.e. for a current delay profile obtained in the step 300 and for the $N_1-1$ preceding delay profiles obtained in the preceding occurrence of the step 300, and this set of CSM spread values is then averaged to obtain the CSM spread value used for selecting the multipath search refining method.

FIG. 5 schematically represents an algorithm performed by the receiver device for refining the results of the multipath search, according to a first embodiment.

The approach present in FIG. 5 is more particularly applicable in the context of a rake receiver device, for which fingers requires multipath configuration.

In the context of the present illustrative embodiment, the algorithm of FIG. 5 is more particularly performed by the delay profile analysis unit 190.

The algorithm of FIG. 5 shows an illustrative embodiment of the step 403, already described with regard to FIG. 4, or of the step 302, already described with regard to FIG. 3.

In a step 500, the delay profile analysis unit 190 obtains a set of candidate paths for which the level of energy is greater than or equal to the threshold T, and restricts this set of candidate paths to delays τ showing a local maximum peak, i.e. delays τ for which the following equations are fulfilled:

$$\begin{cases} DP(\tau) \cdot I > T \\ DP(\tau) \cdot I \geq DP(\tau - 1) \cdot I \\ DP(\tau) \cdot I > DP(\tau + 1) \cdot I \end{cases}$$

In a following step 501, the delay profile analysis unit 190 determines the SNR value for each candidate path remaining in the set of candidate paths after the execution of the step 500. The delay profile analysis unit 190 also determines the SNR value for each value of the delay τ that is a neighbour to such a remaining candidate path. The SNR value for a delay τ is defined as follows:

$$SNR(\tau) = \frac{DP(\tau) \cdot I}{P_{noise}}$$

The SNR values for delays τ that are neighbours to such a remaining candidate path are stored, and used later on during a step 503 described hereafter, if the SNR values for such neighbours are at least equal to a predefined fraction SNRF of the SNR values for their respective candidate paths. In a particular embodiment, the fraction SNRF is equal to 75%.

In a following step 502, the delay profile analysis unit 190 restricts the set of remaining candidate paths to a number F of candidate paths, wherein F is the total number of rake fingers. Only the F candidate paths with the highest SNR values hence remain.

In a following step 503, the delay profile analysis unit 190 filters SNR values using a low-pass filter, such as rectangular Finite Impulse Response (FIR) filter or an Infinite Impulse Response (IIR) filter of first order. The SNR determined for candidate paths in the step 502 is summed over plural instances of the delay profile. For each candidate path, a sum of SNR values is therefore determined for a predefined number $N_2$ of delay profiles, i.e. for a current delay profile obtained in the step 300 and for the $N_2-1$ preceding delay profiles obtained in the preceding occurrences of the step 300.

The application of the low-pass filter allows recovering the channel time diversity that might have been lost in the last delay profile due to fast fading.

An illustrative embodiment of a rectangular FIR filter is detailed hereafter with regard to FIG. 7.

Then, the sums obtained are then compared with a threshold SNRT (SNR Threshold), defined as follows:

$SNRT = k_3 * N_2$ wherein $k_3$ is a constant, which is for instance determined empirically or using simulation tools based on a model of the transmission channel from the transmitter device to the receiver device. In a particular embodiment, $k_3$ is equal to 3.

Each path corresponding to a delay value τ for which the sum of SNR exceeds the threshold SNRT is then retained as a path for the rake fingers configuration.

In a following step 504, the delay profile analysis unit 190 checks whether interpolation is required. This step allows increasing the accuracy of the path delays selected for the rake fingers configuration.

The delay profile analysis unit 190 uses the low-pass filter on the SNR for values of the delay τ that are neighbours of a candidate path remaining after execution of the step 503.

An interpolation is to be applied for the rake fingers configuration when one of the following conditions is met:
  if $SNR_\Sigma(\tau-1)/SNR_\Sigma(\tau) > IT$, then interpolation is required between $(\tau-1)$ and τ;
  if $SNR_\Sigma(\tau+1)/SNR_\Sigma(\tau) > IT$, then interpolation is required between τ and $(\tau+1)$.
wherein:
  $SNR_\Sigma(\tau)$ represents the sum of SNR performed by applying the low-pass filter for a delay τ; and
  IT (Interpolation Threshold) represents a predefined threshold.

In a particular embodiment, the threshold IT is equal to 20%. It means that, when the SNR after low-pass filtering for a neighbour of a path candidate is greater than a given fraction of the SNR after low-pass filtering of the considered path candidate, an interpolation is to be applied to improve the accuracy of the path delay.

Then, for configuring the rake fingers, the delay profile analysis unit 190 provides the paths resulting from the step 503, as well as a flag indicating for each path whether an interpolation may be applied with a neighbour value of the corresponding delay τ to improve delay accuracy of the configuration of the concerned rake finger.

FIG. 6 schematically represents an algorithm performed by the receiver device for refining the results of the multipath search, according to a second embodiment.

The approach described with regard to FIG. 6 is more particularly suitable for a rake receiver device, but is also applicable in the context of a LMMSE receiver device.

In the context of the present illustrative embodiment, the algorithm of FIG. 6 is more particularly performed by the delay profile analysis unit 190.

The algorithm of FIG. 6 shows an illustrative embodiment of the step 403, already described with regard to FIG. 4, or of the step 302, already described with regard to FIG. 3.

In a step 601, the delay profile analysis unit 190 obtains a set of candidate paths for which the level of energy is greater than or equal to the threshold T. Then, the delay profile analysis unit 190 determines the SNR value for each candidate path in the set of candidate paths. It is reminded that the SNR value for a delay τ is defined as follows:

$$SNR(\tau) = \frac{DP(\tau) \cdot I}{P_{noise}}$$

In a following step 602, the delay profile analysis unit 190 filters SNR values using a low-pass filter, such as a rectangular FIR filter or an IIR filter of first order. The SNR determined for candidate paths in the step 600 is summed over plural instances of the delay profile. For each candidate path, a sum of SNR values is therefore determined for the predefined number $N_2$ of delay profiles, i.e. for a current delay profile obtained in the step 300 and for the $N_2-1$ preceding delay profiles obtained in the preceding occurrences of the step 300.

The application of the low-pass filter allows recovering the channel time diversity that might have been lost in the last delay profile due to fast fading.

An illustrative embodiment of a rectangular FIR filter is detailed hereafter with regard to FIG. 7.

In a following step 603, the delay profile analysis unit 190 removes, for each bunch of neighbour candidate paths if any, the candidate path corresponding to the pulse rise in the delay profile. The removed candidate paths are considered as fake candidates. In other words, it consists in removing at most one fake candidate path at the beginning of each bunch of contiguous candidate paths.

To achieve this, the SNR sum $SNR_\Sigma(\tau)$ is reset to zero for any delay value τ for which the following conditions are met:

$$\begin{cases} SNR_\Sigma(\tau-1) = 0 \\ SNR_\Sigma(\tau) > 0 \\ SNR_\Sigma(\tau+1) > 0 \\ \frac{SNR_\Sigma(\tau)}{SNR_\Sigma(\tau+1)} < PRT \end{cases}$$

wherein PRT (Pulse Rise Threshold) represents a predefined threshold.

In a particular embodiment, the threshold PRT is equal to 39.62%, which is suitable for the wave shape of a WCDMA signal in the context of the $3^{rd}$ generation (3G) of mobile phones.

In a following step 604, the delay profile analysis unit 190 restricts the set of candidate paths to the F candidate paths with the highest SNR values. According to the considered receiver type, F corresponds to:
  the maximum number of fingers in case of a rake receiver; or
  the maximum number of taps of the LMMSE equalizing filter in case of an LMMSE receiver.

FIG. 7 schematically represents an embodiment of a FIR filter that may be used in the aforementioned first and/or second embodiments for refining the results of the multipath search with regard to FIGS. 5 and 6.

The FIR filter 710 comprises an array 700, or table, of SNR values. These SNR values are determined in the step 501 and/or in the step 601, already described with regard respectively to FIGS. 5 and 6. The array 700 consists of $N_2$ lines and of columns, one column for each value of the delay τ. One line of the array 700 corresponds to one delay profile, as obtained in the step 300. When a new delay profile is obtained in the step 300, the lines of the array 700 are shifted by one unit, the oldest line being removed, and a blank line is therefore inserted. The SNR values determined in the step 501 and/or in the step 601 are then stored in the inserted blank line and, for each other value of the delay τ in the inserted blank line, the SNR value is set to 0.

The FIR filter 710 further comprises a summing unit 701. The summing unit 701 sums the SNR values per column, and stores the results $SNR_\Sigma(\tau)$ in a set of registers 702.

The invention claimed is:

1. A method for determining paths in the scope of a multipath search aiming at being used to configure a device of a wireless communications system, the method performed at the device and comprising:
  obtaining a delay profile of a code division multiple access transmission signal, the delay profile being in a form of complex symbols, each complex symbol resulting from a despreading of said received signal after being delayed by a distinct delay; wherein the method further causes the device to perform:

comparing the real part of said complex symbols forming the delay profile with a first threshold, the first threshold being determined on the basis of a noise level determined by the imaginary part of said complex symbols forming the delay profile; and determining said paths on the basis of the comparing.

2. A memory, storing computer program code instructions which when executed by a programmable device, causes the device to at least:

obtain a delay profile of a code division multiple access transmission signal, the delay profile being in a form of complex symbols, each complex symbol resulting from a despreading of said received signal after being delayed by a distinct delay;

compare the real part of said complex symbols forming the delay profile with a first threshold, the first threshold being determined on the basis of a noise level determined by the imaginary part of said complex symbols forming the delay profile; and determine said paths on the basis of the comparing.

3. A device for determining paths in the scope of multipath search, said device being adapted for use in a wireless communications system, said device comprising circuitry and a memory storing program code instructions which when executed by the circuitry cause the device to:

obtain a delay profile of a code division multiple access transmission signal, the delay profile being in a form of complex symbols, each complex symbol resulting from a despreading of said received signal after being delayed by a distinct delay;

compare the real part of said complex symbols forming the delay profile with a first threshold, the first threshold being determined on the basis of a noise level determined by the imaginary part of said complex symbols forming the delay profile; and determine said paths on the basis of the comparing.

4. The device according to claim 3, wherein the noise level is the sum of the absolute values of the imaginary part of said complex symbols, said sum being divided by a correlation comb depth of the delay profile.

5. The device according to claim 3, wherein determining said paths on the basis of the comparing comprises refining a multipath search according to a category to which the delay profile belongs from amongst:

a first category in which the energy spread for one path is separated from the energy spread for another path; and a second category in which the energy spread for one path overlaps on the energy spread on another path.

6. The device according to claim 5, wherein said circuitry and said memory with the computer program code instructions further cause the device to determine the category to which the delay profile belongs on the basis of an indication of successive values, in the delay profile, that are greater than or equal to the first threshold.

7. The device according to claim 6, wherein, when the delay profile comprises plural bunches of successive values that are greater than or equal to the first threshold, said indication designates the bunch among said bunches having the highest number of successive values that are greater than or equal to the first threshold.

8. The device according to claim 7, wherein said circuitry and said memory with the computer program code instructions further cause the device to average said indication of successive values over plural successive delay profiles.

9. The device according claim 7, wherein said circuitry and said memory with the computer program code instructions cause the device to, when said indication indicates that successive values are greater than or equal to the first threshold, determine the category to which the delay profile belongs by comparing the number of said successive values with a second threshold.

10. The device according to claim 5, wherein said circuitry and said memory with the computer program code instructions cause the device to determine said paths on the basis of the comparing by:

identifying local maximum peaks in the delay profile; and determining a set of candidate paths on the basis of the identified local maximum peaks.

11. The device according to claim 10, wherein said circuitry and said memory with the computer program code instructions cause the device to:

determine a signal-to-noise ratio value for each said candidate path; and limit said set of candidate paths to a predetermined number of candidate paths on the basis of the determined signal-to-noise ratio values, the predetermined number of candidate paths being equal to a number of fingers of the device.

12. The device according to claim 10, wherein said circuitry and said memory with the computer program code instructions cause the device to:

determine a signal-to-noise ratio value for each said candidate path; and limit said set of candidate paths to a predetermined number of candidate paths on the basis of the determined signal-to-noise ratio values, the predetermined number of candidate paths being equal to a number of equalizing filter taps of the device.

13. The device according to claim 10, wherein said circuitry and said memory with the computer program code instructions cause the device to:

determine a signal-to-noise ratio value for each said candidate path and for neighbouring delays in the delay profile;

store said signal-to-noise ratio value for each said candidate path over plural successive delay profiles; and store said signal-to-noise ratio value for each said neighbouring delay over plural successive delay profiles, when the signal-to-noise ratio value for said neighbouring delay is equal to or greater than a predetermined fraction of the signal-to-noise ratio value for its respective candidate path.

14. The device according to claim 13, wherein said circuitry and said memory with the computer program code instructions cause the device to:

apply a low-pass filter on the signal-to-noise ratio values determined over plural successive delay profiles, and determine said paths on the basis of the filtered signal-to-noise ratio values.

15. The device according to claim 14, wherein applying said low-pass filter comprises summing the signal-to-noise ratio values for each delay over plural successive delay profiles.

16. The device according to claim 14, wherein said low-pass filter is one of:

a rectangular finite impulse response filter; or an infinite impulse response filter of first order.

17. The device according to claim 15, wherein said circuitry and said memory with the computer program code instructions cause the device to compare the filtered signal-to-noise ratio values with a third threshold.

18. The device according to claim 14, wherein said circuitry and said memory with the computer program code instructions cause the device to set a flag related to a path interpolation, when the ratio between the filtered signal-to-noise ratio of a neighbouring delay and the filtered signal-to-noise ratio of its respective candidate path is greater than a fourth threshold.

19. The device according to claim 5, wherein said circuitry and said memory with the computer program code instructions cause the device to determine said paths on the basis of the comparing by:
- determining a signal-to-noise ratio value for each candidate path, a candidate path having a value in the delay profile that is greater than or equal to the first threshold;
- applying a low-pass filter on the signal-to-noise ratio values determined over plural successive delay profiles, and
- determining said paths on the basis of the filtered signal-to-noise ratio values.

20. The device according to claim 19, wherein applying said low-pass filter comprises summing the signal-to-noise ratio values for each delay over plural successive delay profiles.

* * * * *